United States Patent [19]

Kanayama et al.

[11] Patent Number: 5,463,434
[45] Date of Patent: Oct. 31, 1995

[54] VIDEO PROJECTOR WITH A PLURALITY OF PROJECTION DEVICES

[75] Inventors: Hideyuki Kanayama; Ryuhei Amano; Kenji Yamauchi; Keiichi Kanatani, all of Osaka, Japan

[73] Assignee: Sanyo Electric Co., Ltd., Osaka, Japan

[21] Appl. No.: 233,235

[22] Filed: Apr. 26, 1994

[30] Foreign Application Priority Data

Apr. 26, 1993 [JP] Japan ................... 5-099378

[51] Int. Cl.⁶ .................................................. G03B 21/00
[52] U.S. Cl. ................... 353/94; 353/7; 353/38; 353/31; 359/40
[58] Field of Search ................... 353/30, 31, 38, 353/7, 94; 359/40, 41, 48, 49, 67, 464, 472, 475, 476

[56] References Cited

U.S. PATENT DOCUMENTS

| | | | |
|---|---|---|---|
| 4,987,487 | 1/1991 | Ichinose et al. | 359/464 |
| 5,001,555 | 3/1991 | Park | 359/464 |
| 5,042,921 | 8/1991 | Sato et al. | 359/40 |
| 5,125,733 | 6/1992 | Lee | 353/7 |
| 5,300,966 | 4/1994 | Uehira et al. | 353/94 |

FOREIGN PATENT DOCUMENTS

| | | |
|---|---|---|
| 63-248293 | 10/1988 | Japan. |
| 03065943 | 2/1991 | Japan. |
| 03097390 | 3/1991 | Japan. |

*Primary Examiner*—William A. Cuchlinski, Jr.
*Assistant Examiner*—William C. Dowling
*Attorney, Agent, or Firm*—Spensley Horn Jubas & Lubitz

[57] ABSTRACT

A video projector has first and second projector devices and a display screen. The first projector device is used to project a plurality of first image elements to be perceived by, for example, the right eye of a viewer. The second projector device is used to project a plurality of second image elements to be perceived by, for example, the left eye of the viewer. The first image elements from the first liquid crystal projector device and the second image elements from the second liquid crystal projector device are projected on the display screen. The size of image elements projected on a liquid crystal display panel is adjusted so that the adjacent image elements do not overlap with each other. As a result, interference between adjacent picture elements is substantially eliminated and thus the image quality is improved.

20 Claims, 9 Drawing Sheets

VIDEO PROJECTOR WITH A PLURALITY OF PROJECTION DEVICES

FIELD OF THE INVENTION

The present invention relates to a video projector. More particularly, the present invention relates to a video projector having a plurality of projection devices for projecting an image on a single display screen.

BACKGROUND OF THE INVENTION

The prior art, such as, for example, unexamined Japanese Patent Publication HEI 3-65943 describes a stereo-graphic display apparatus. The apparatus has a liquid crystal display panel and a projection lens. Images displayed on the liquid crystal display panel are projected by the projection lens on a screen. The screen has a diffusion plate and a lenticular plate. By the function of the lenticular plate, an observer can recognize a stereo-graphic image from the screen.

Figure 7:
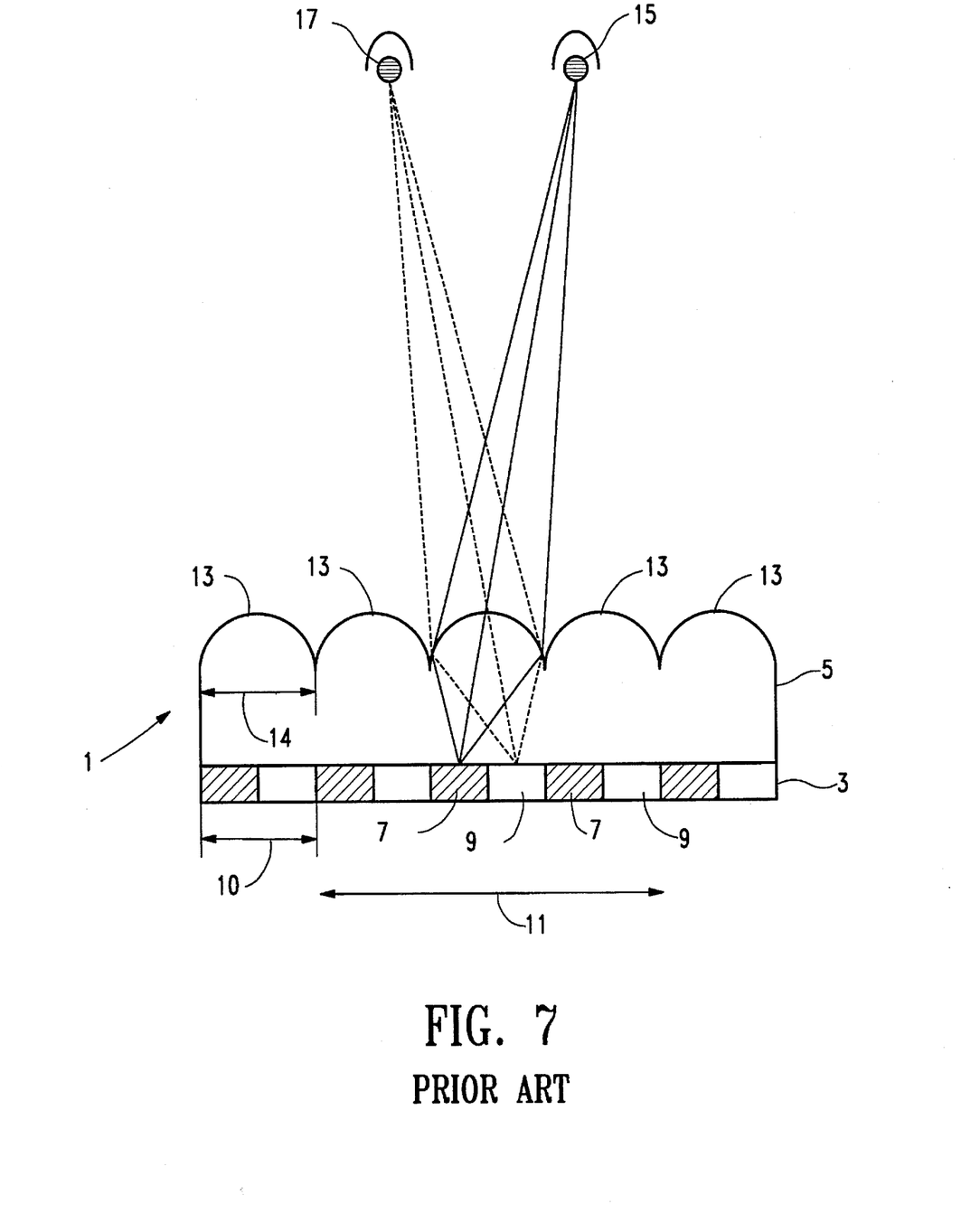
FIG. 7 is an illustrative view showing the principle of stereo-graphic viewing.

FIG. 7 shows the principle of a stereograph. A screen 1 has a diffusion plate 3 and a lenticular plate 5. An image is projected from a projection device (not shown in FIG. 7) on the diffusion plate 5. Left picture elements 7 of the projected image and right picture elements 9 of the projected image are projected on the diffusion plate 5. The left picture elements and the right picture elements are disposed alternately with each other in a horizontal direction 11 of the screen 1.

The lenticular plate 5 has a plurality of elongated strips of lenticular lenses 13 oriented along a vertical direction on the screen. The vertical direction is drawn as perpendicular to the horizontal direction 11 and the surface of the drawing page. Each lenticular lens 13 has a width 14 which is approximately equal to a length 10 of two picture elements along the horizontal direction 11.

Light from each picture elements 7, 9 of the projected image is refracted by the lenticular lens 13 and reaches the eyes 15, 17 of an observer. More particularly, the light from the left picture element 7 reaches the left eye 15 of the observer, and the light from the right picture element 9 reaches the right eye 17 of the observer. The right picture elements 7 and the left picture elements 9 contain image information with a parallax similar to that of the binocular parallax by which a person can sense stereo-graphic vision. (The image information is called a parallax information hereafter.) As a result, the observer can sense stereoscopic vision from the screen 1.

FIG. 7 shows only an ideal status about the right and the left picture elements. As described above, the projected image on the screen 1 comes from a liquid crystal display panel (not shown in FIG. 7). The liquid crystal display panel includes a black matrix region which light can not pass through. The black matrix separates picture elements of the liquid crystal display panel from each other. The black matrix also protects from light thin film transistors and bath-lines that drive a liquid crystal. Because of the presence of the black matrix, shadows of the black matrix are formed on the screen 1. The shadow on the screen may effect the quality of the image.

Figure 8:
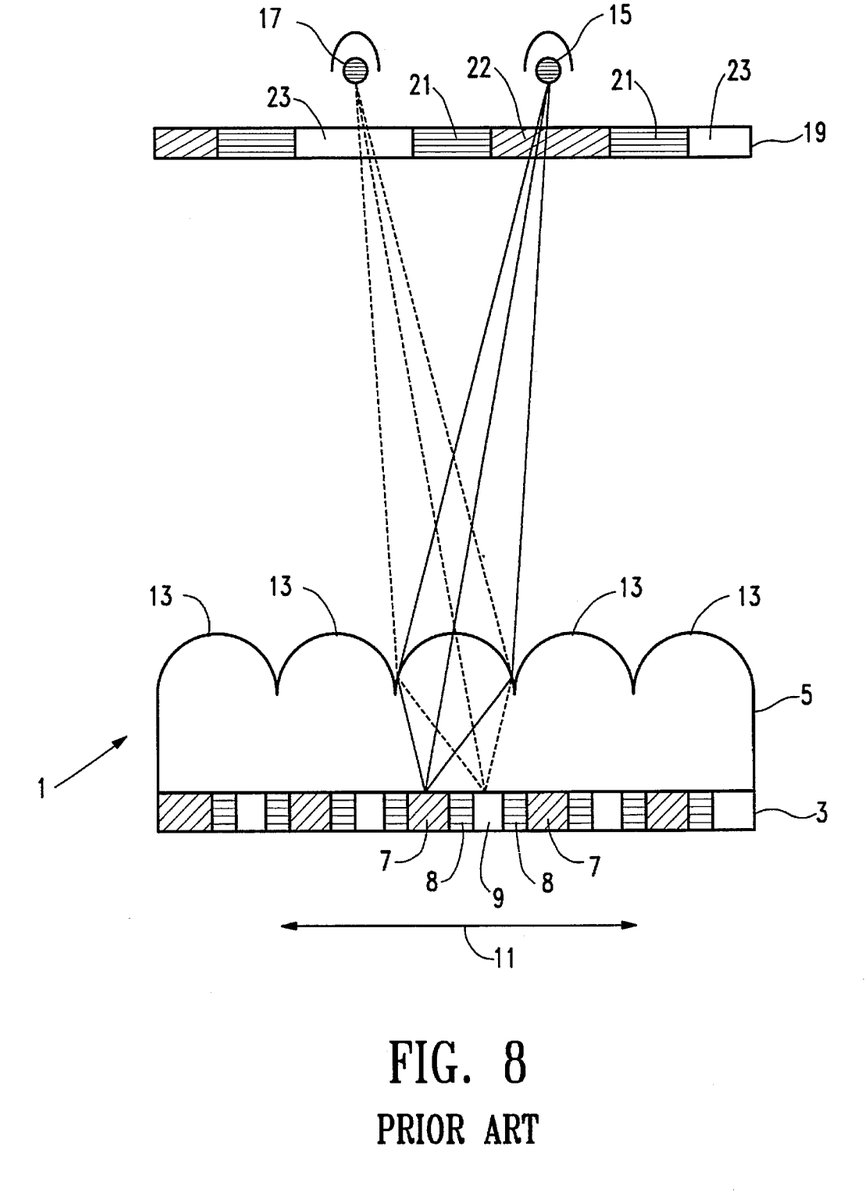
FIG. 8 is an explanatory view showing a defect of a prior art device.

FIG. 8 shows the situation mentioned above. Shadows 8 of the black matrix are formed between the picture elements 7 and the picture elements 9 on the screen 1, since the black matrix region is disposed between each picture element of the liquid crystal display panel and the black matrix does not pass light therethrough. The lenticular lens 13 provides images 21, 22 and 23 on an imaginary plane 19. Therefore, when the observer is moving along the horizontal direction 11, he may see the shadows 21 of the black matrix in the liquid crystal display panel. As a result, the quality of the displayed image deteriorates.

Figure 9:
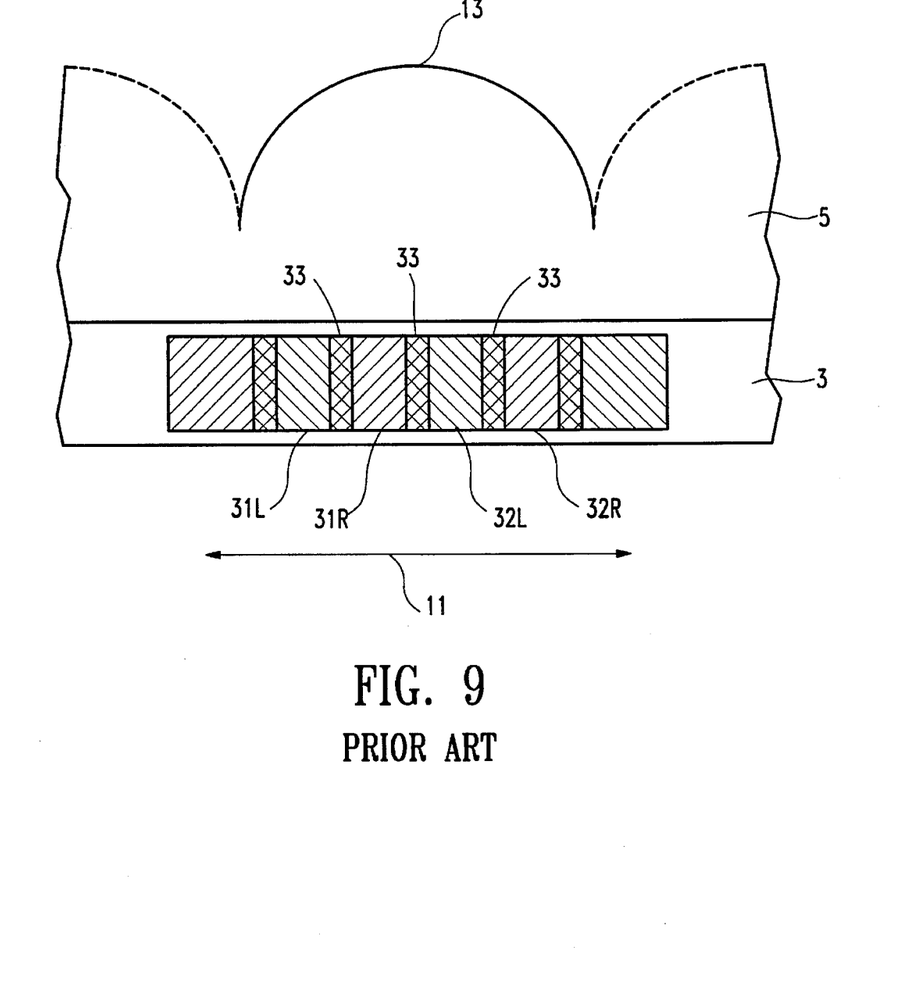
FIG. 9 is an explanatory view showing another defect of a prior art device.

One method for preventing the deterioration of the quality of the displayed image is to use a plurality of projector devices. For example, two projector devices respectively project left and right picture elements, and two picture elements from the projector devices are superimposed on a screen. Left picture elements and right picture elements are focused alternately along the horizontal direction 11. For example, as shown in FIG. 9, four picture elements in one lenticular lens 13 are used. The four picture element include a first left picture element 31L, a first right picture element 31R, a second left picture element 32L, and a second right picture element 32R. The first left picture element 31L and the second left picture element 32L are projected from a first projector device (not shown in FIG. 9). The first right picture element 31R and the second right picture element 32R are projected from a second projector device (not shown in FIG. 9). The method of using four picture elements is called the multiple-eye method or four eye-method. This method is preferable to enlarge a region in which an observer can sense a stereo-graphic view as compared to a two eye method, such as for example, shown in FIG. 7.

As shown in FIG. 9, since the width of the black matrix, on the diffusion plate 3 along the horizontal direction 11, is narrower than the width of each picture element, adjacent picture elements overlap with each other to form superimposed portions 33 when the four picture elements are projected alternately by the two projector devices. These superimposed portions 33 deteriorate the quality of stereo-graphic image, because the image obtained by the lenticular lens contains redundant information generated by interference between adjacent picture elements.

The degree of the above image deterioration problem depends on the ratio between the width of the black matrix and the width of aperture part, namely, the picture element of the liquid crystal display panel. The image quality may be improved by optimizing the ratio. However, the ratio should be adjusted depending on the diffusion characteristics of the diffusion plate 3, which vary substantially from one diffusion plate to another. Therefore, it is not very practical and economical to optimize the ratio in the manufacturing process. In other words, if the diffusion characteristics of a diffusion plate differ, it is necessary to prepare a different liquid crystal display panel which has a different ratio between the width of the black matrix and the width of the aperture part.

The problem of the deteriorated image quality is not limited to a stereo-graphic video projector having a plurality of projector devices. An ordinary video projector having a plurality of projector devices may suffer the same problem.

SUMMARY OF THE INVENTION

An object of embodiments of the present invention is to provide a video projector which projects images having improved quality.

Another object of embodiments of the present invention is to provide a stereo-graphic video projector which projects images having improved quality.

These and other objects of the present invention are achieved by a video projector having a first and a second projector liquid crystal devices and a display screen. The first projector device is used to project a plurality of first image elements to be perceived by, for example, the right eye of a viewer. The second projector device is used to project a plurality of second image elements to be perceived by, for example, the left eye of the viewer. The first image elements from the first liquid crystal projector device and the second image elements from the second liquid crystal projector device are projected on the display screen.

In accordance with one aspect of embodiments of the present invention, the size of the image elements projected on a liquid crystal display panel is adjusted. As a result, interference between adjacent picture elements is substantially eliminated and thus the image quality is improved.

DETAILED DESCRIPTION OF THE PREFERRED EMBODIMENTS

Figure 1:
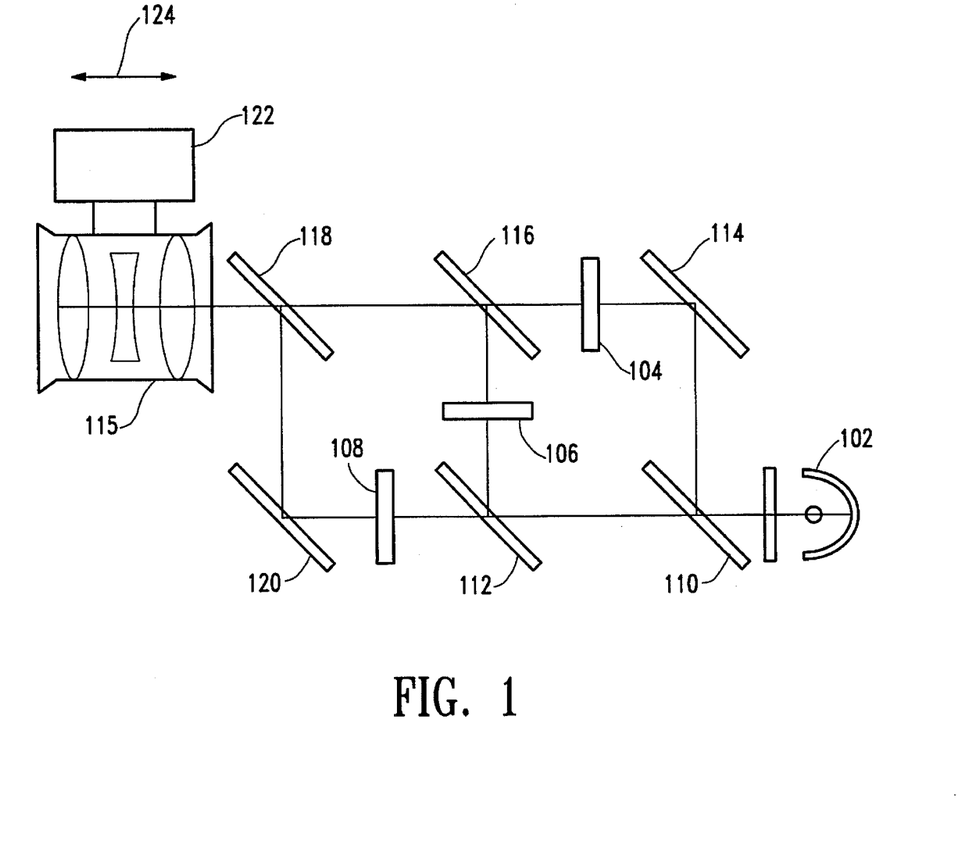
FIG. 1 schematically shows an optical system of one embodiment of the present invention.

FIG. 1 shows an optical system of a projector device 100 in one embodiment of the present invention. A light source 102 provides parallel light. The projector device 100 has three liquid crystal display panels 104, 106 and 108. Each liquid crystal display panel is respectively associated with three primary colors of light, green (G), red (R) and blue (B). Light from the light source 102 is converted to red light, green light and blue light, by two dichroic mirrors 110 and 112. First dichroic mirror 110 reflects green light and pass other elements of light. Second dichroic mirror 112 reflects red light and pass blue light. Therefore, green light reflected by a reflector 114 passes through first liquid crystal display panel 104. Further, red light and blue light separated by the second dichroic mirror 112 pass through respectively the second liquid crystal display panel 106 and the third liquid crystal display panel 108.

A video signal generator (not shown in FIG. 1) provides video signals to each liquid crystal display 104, 106 and 108. The first liquid crystal display panel 104 displays images associated with green. The second and third liquid crystal display panel 106 and 108 respectively display images associated with red and blue. Therefore, green light, red light and blue right are respectively modified by green information, red information and blue information displayed on each liquid crystal display panel 104, 106 and 108.

The three modified light beams take respective optical paths and reach a projector lens 115. The projector lens 115 focuses images of liquid crystal display panels 104, 106 and 108 at a predetermined distance on a display screen (not shown in FIG. 1). The green light from the first liquid crystal display panel 104 passes through a third dichroic mirror 116 and a forth dichroic mirror 118. The red light from the second liquid crystal display panel 106 is reflected by the third dichroic mirror 116 and passes through the fourth dichroic mirror 118. The blue light from the third liquid crystal display panel 108 is reflected by a second reflector 120 and the forth dichroic mirror 118. The length of each optical path, namely, optical paths of green, red and blue light are equal. In other words, the distance between the light source 102 and the first liquid crystal display panel 104, the distance between the light source 102 and the second crystal display panel 106 and the distance between the light source 102 and the third crystal display panel 108 have the same value. Further, the distance between the projection lens 115 and the first liquid crystal display panel 104, the projection lens 115 and the second liquid crystal display panel 106 and the projection lens 115 and the third liquid crystal display panel 108 also have all the same value.

The projection lens 115 is coupled to an adjustor 122 and is movable along a direction 124 of its optical axis. The movement of the projection lens 115 along its optical axis makes a change in the distance between the projection lens 115 and the liquid crystal display panels 104, 106 and 108.

In this embodiment, the projection lens 115 is movable. On the other hand, a position adjustor may be provided to each liquid crystal display panel 104, 106 and 108 to adjust the distance between the projection lens 115 and the liquid crystal display panel 104, 106 and 108. Further, a focal point position adjustor (not shown) can be disposed between the projection lens 115 and each liquid crystal display panel 104, 106 and 108, for example, between the projection lens 115 and the forth dichroic mirror 118. A typical focal point position adjustor has a glass plate whose Thickness is gradually changed along on an operation direction from thick to thin. Moving the glass plate of the focal point position adjustor along the operation direction changes the focal point of the projection lens 115. This provides the same effect as that provided by the change in the distances between the projection lens 115 and the liquid crystal display panels 104, 106 and 108.

Figure 2:
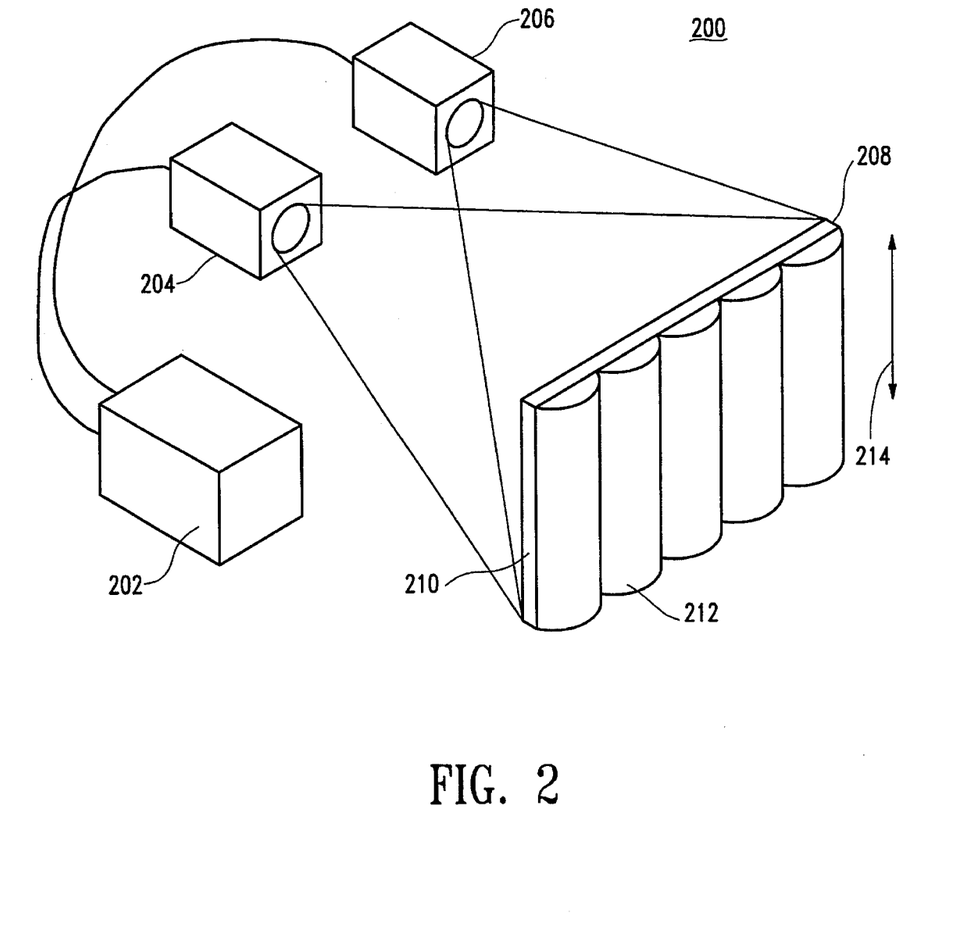
FIG. 2 is a perspective view showing the structure of one embodiment of the present invention.

FIG. 2 shows a stereo-graphic video projector 200 in accordance with one embodiment of the present invention. A stereo-graphic video signal generator 202 provides a first video signal for the right eye of a viewer and a second video signal for the left eye to a first projection device 204 and a second projection device 206, respectively. When the first and second video signal are recorded, the first video signal is generated by a video camera corresponding to the right eye of a person, and the second video signal generated by a video camera corresponding to the left eye. Each projection device 204 and 206 respectively projects images on a diffusion plate 210 of a screen 208. An image associated with the right eye and an image associated with the left eye are superimposed on the diffusion plate 210. Further, picture elements of the image from the first projection device 204 and picture elements of the image from the second projection device 206 are alternately disposed on the diffusion plate 210.

The opposite side of the diffusion plate 210 is a lenticular plate 212. The lenticular plate 212 has a plurality of lenticular lenses arranged along the vertical direction 214 of the screen 208. By the imaging function of the lenticular lenses, the observer senses a stereo-graphic image from the screen 208. Instead of the lenticular plate, a parallax barrier may be used. The parallax barrier also can separate the left eye information from the right eye information on the diffusion plate 210.

Figure 3:
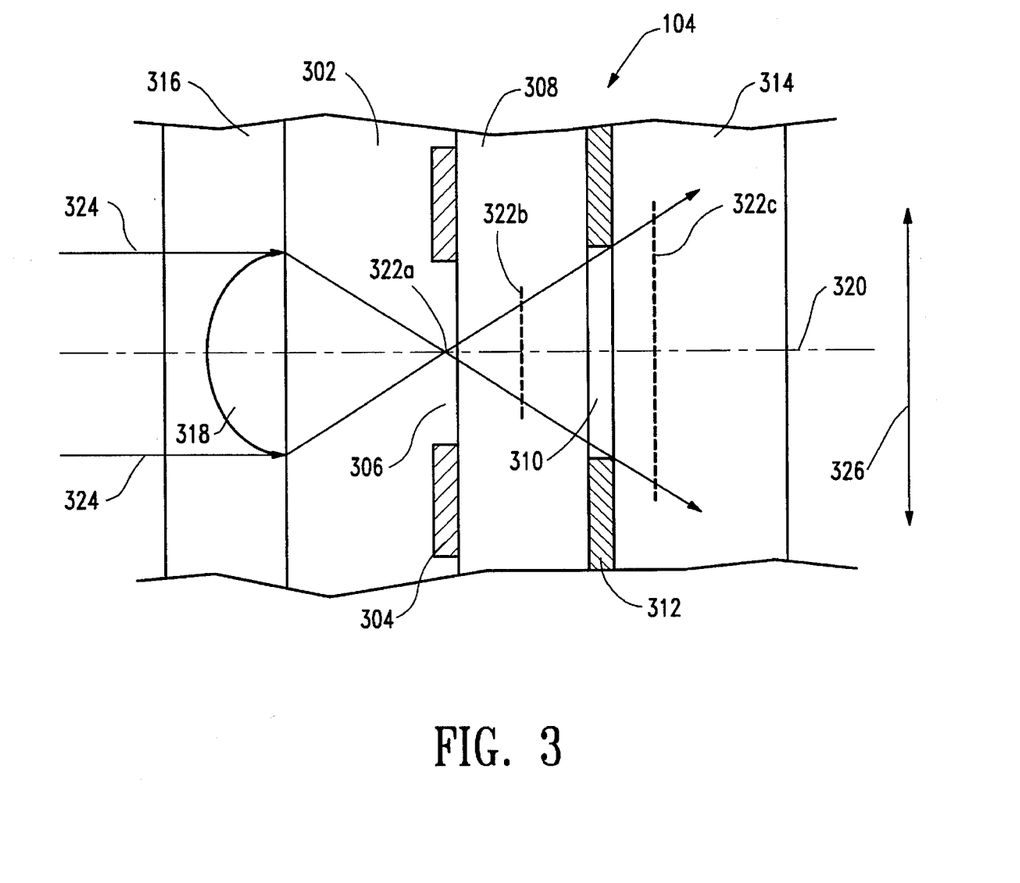
FIG. 3 is a sectional view showing a structure adjacent to a display panel of one embodiment of the present invention.

FIG. 3 shows an enlarged portion of one of the liquid crystal display panels, for example, 104. FIG. 3 is a sectional view taken along a horizontal direction 326 of the liquid crystal display panel, which is perpendicular to the vertical direction 214 of the screen 208 in FIG. 2.

The liquid crystal display panel 104 has a glass plate 302 on an incident side, namely the side near the light source 102. A black matrix 304 is attached to the glass plate 302. The black matrix has apertures 306. A liquid crystal layer 308 is disposed between the glass plate 302 and a glass plate 314 on an output side, namely the side near the projection lens 115 (not shown in FIG. 3). The liquid crystal layer 308 contains picture element electrodes 310 and thin film transistors 312. The black matrix 304 has a lattice form and is made of a material which reflects light from the light source 102. The black matrix 304 also protects the thin film transistors 312 from light, which transistors are affected by light. The black matrix 304 has apertures 306 associated with the picture element electrodes 310. As the picture element electrodes 310 are transparent, light from the light source 102 can pass through the apertures 304 and the picture element electrodes 310.

A micro-lens plate 316 is provided on the glass plate 302. The micro-lens plate 316 has a plurality of micro-lenses 318, and each micro-lenses is associated with one aperture 306, namely, one picture element of the liquid crystal panel 104. The micro-lens 318 condenses parallel ray 324 of light emitted from the light. source 102 as shown in FIG. 1. The light is focused at the aperture 306, and passes through a portion of the liquid crystal layer 308, i.e., the portion which is associated with the picture element electrode 310.

Any one of the optical devices having a focusing function may be used for the micro-lens, such as example, a micro-lens plate manufactured by an ion exchange method or a miniature micro-lens having convex forms. Further, the micro-lens plate 316 may be formed by a plurality of cylindrical lenses disposed in an array along a horizontal direction (that is perpendicular to the vertical direction 326) of the liquid crystal display panel 104. Each cylindrical lens extends along the vertical direction. The width of each cylindrical lens along the horizontal direction thereof coincides with a pitch of the picture element of the liquid crystal display panel along the horizontal direction.

The portion of the liquid crystal layer 308, which portion is associated with the picture element electrode 310, varies in transparency according to a signal provided to the picture element electrode 310. Therefore, light from the micro-lens 318 is modified in transmittancy according to the video signal provided to the picture element electrode 310.

Figure 4:
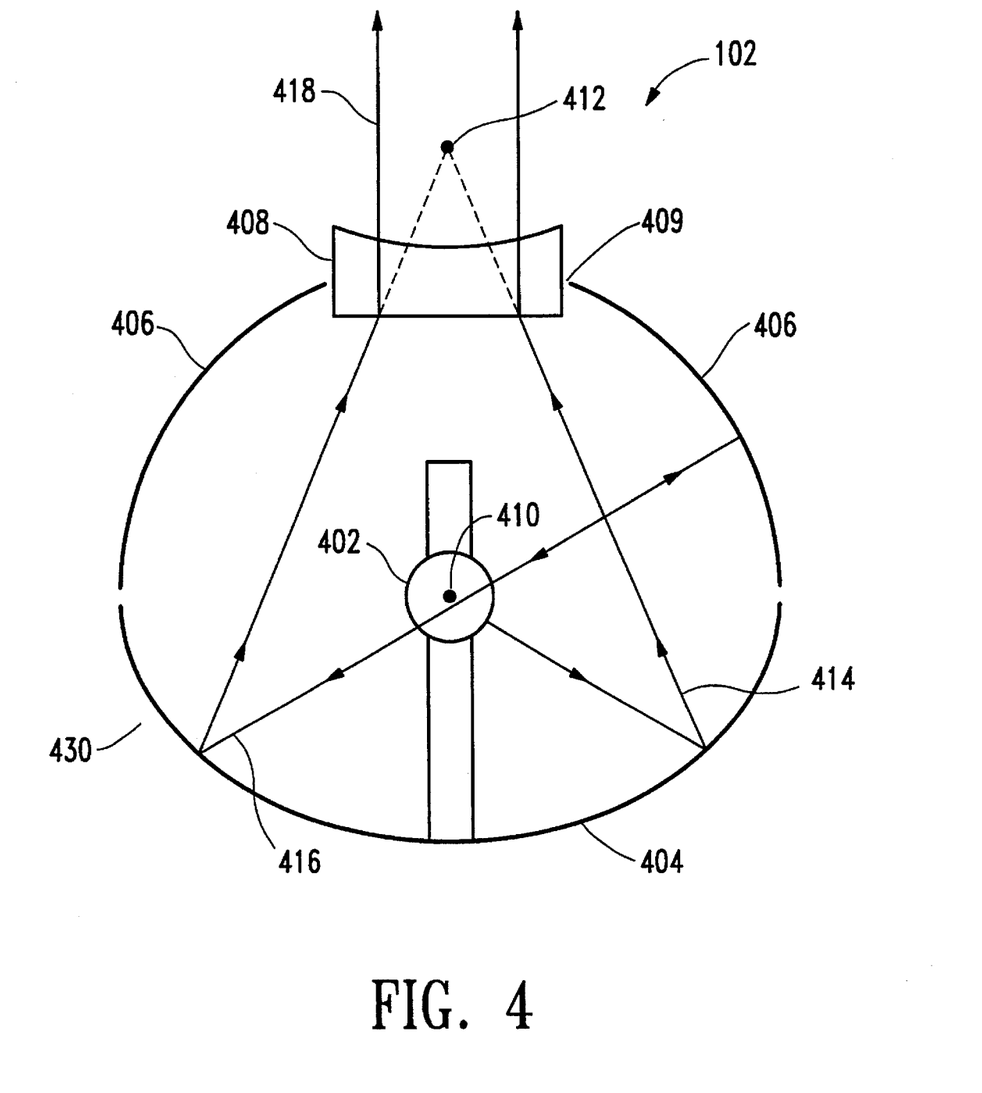
FIG. 4 is a sectional view showing a light source of one embodiment of the present invention.

FIG. 4 shows the detail structure of the light source 102 in FIG. 1. The light source 102 contains a metal halide lamp 402. The metal halide lamp 402 is provided in a spherical reflector 430 which is a combination of an ellipsoidal reflector 404 and a spherical reflector 406. A concave lens 408 is disposed at a light outlet 409 of the sphere 430. The center 410 of the emitting light in the metal halide lamp 402 coincides with the first focal point of the ellipsoidal reflector 404 and, further, the center of curvature of the spherical reflector 406. The focal point 412 of the concave lens 408 coincides with the second focal point of the ellipsoidal reflector 404.

Part of light emitted from the metal halide lamp 402 is reflected by the ellipsoidal reflector 404 as shown by line 414, or firstly reflected by the spherical reflector 406 and secondly reflected by the ellipsoidal reflector 404 as shown by line 416. Light eventually passes through the concave lens 408 and is converted into a parallel ray 418. The light source 102 may be provided by any one of devices that emits parallel light. Further, a device having a conversion lens system which converts light from an ordinary light source to parallel rays may also be used for the light source 102 in FIG. 1.

In this embodiment, a focal point of the projection lens 115 (see FIG. 1) can be adjusted by means of the adjustor 122 of the projection lens 115. As described above, the adjustor 124 changes the position of the projection lens 115 along the optical axis 320. As a result, the focal point of the projection lens 115 is changed, for example, to a position of 322a, 322b or 322c, as shown in FIG. 3.

Figure 5:
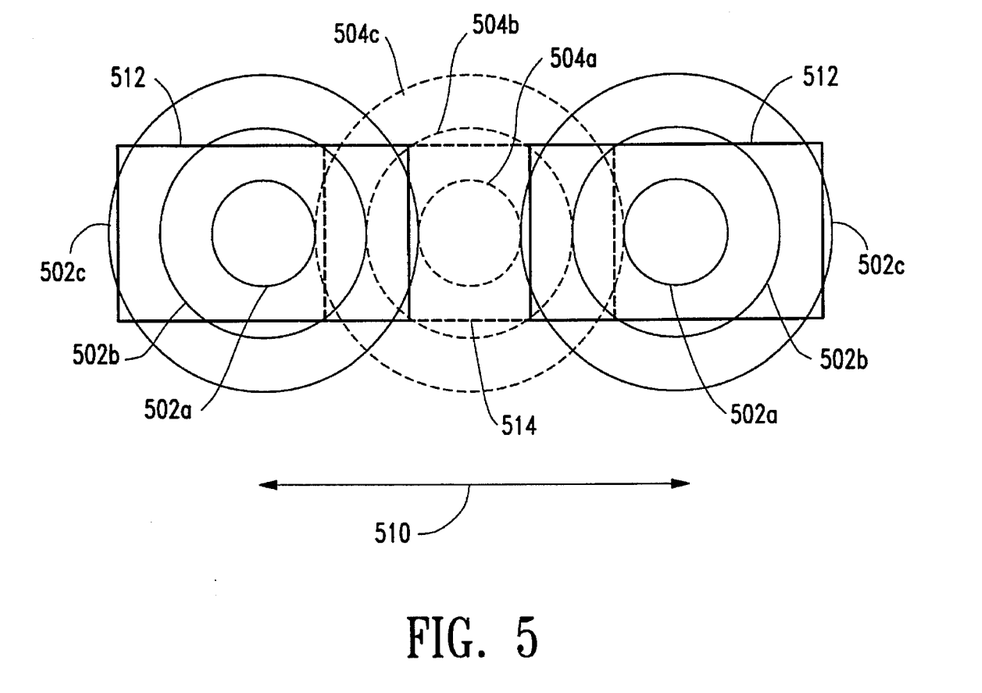
FIG. 5 schematically illustrates an adjustment operation of one embodiment.

According to the position of the focal point, for example, 322a, 322b and 322c, the diameter of a light spot, which is an image on the diffusion plate 210 projected from the picture element of the liquid crystal 104, is changed. FIG. 5 shows light spots having different diameters which are formed as a result of the changes in the focal point. The solid line shows a light spot from the first projector device 204, and the doted line shows a light spot from the second projector device 206 of FIG. 2. There are a large, a medium and a small circle. The large circle 502c is a light spot formed according to the position 322c of the focal point in FIG. 3. The medium circle 502b and the small circle 502a respectively correspond to the position 322b and 322a. For the second projector device 206, the situation is the same as the case of the first projection device 204. The large circle 504c, the medium circle 504b and the small circle 504c respectively correspond to the positions 322c, 322b and 322a.

Therefore, each adjustor in the first and the second projection device 204 and 206 is adjusted to change each diameter of the light spot on the diffusion plate 210 so as to avoid an overlapping between two adjacent light spots. For example, when two adjacent light spots are adjusted to the medium circles 502b and 504b, there is no overlapping between two adjacent light spots. In FIG. 5, a rectangular 512 represents the form of the picture element in the liquid crystal display panel of the first projector device 204. A rectangular 514 represents the form of the picture element in the liquid crystal display panel of the second projector device 206.

Figure 6:
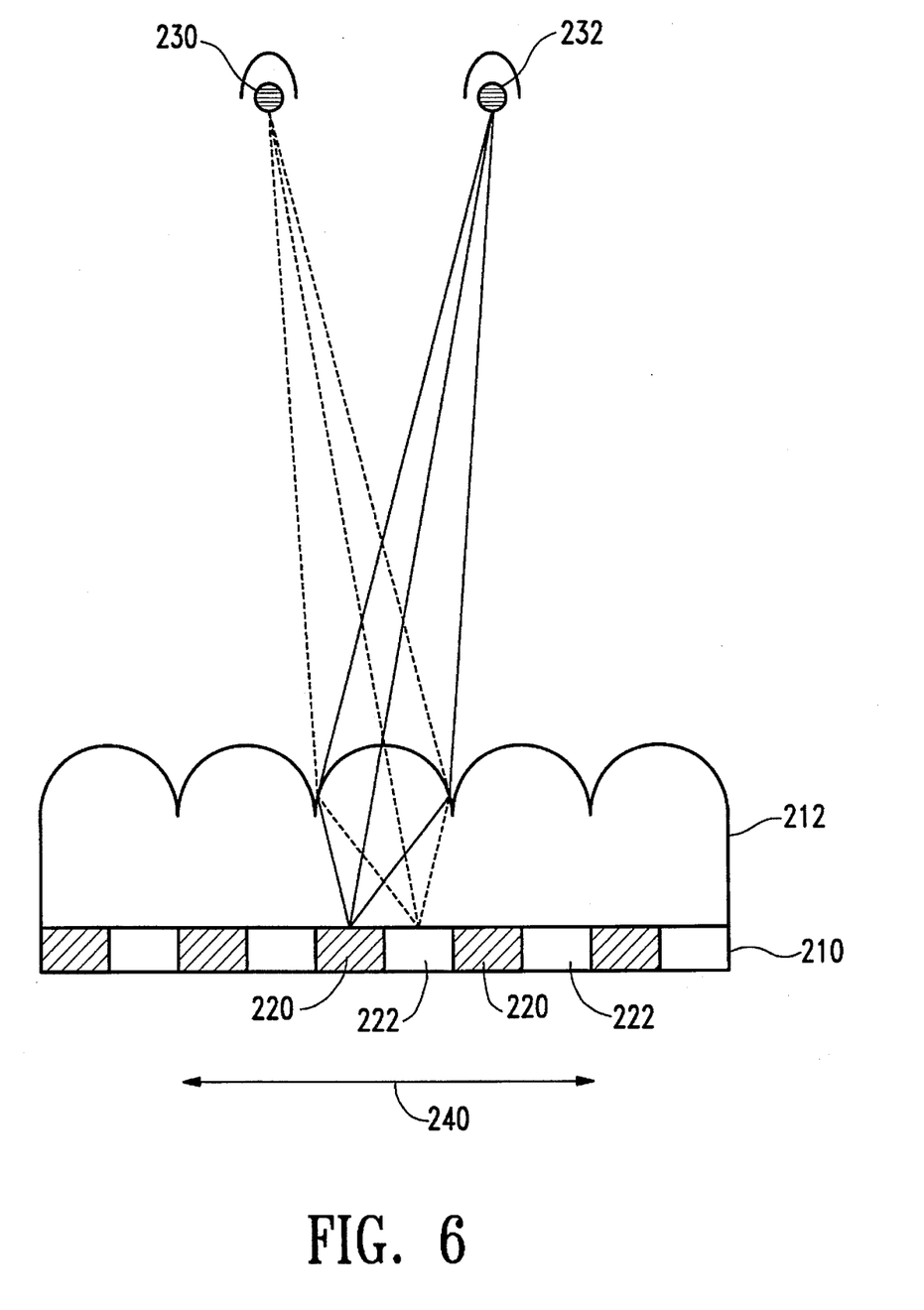
FIG. 6 schematically illustrates an imaging status in one embodiment of the present invention.

FIG. 6 shows a preferable status of the projected light spots (picture element) on the screen 210. Picture elements 220 are. projected from the first projector device 204 (not shown in FIG. 6), and picture elements 222 are projected from the second projector device 206 (not shown in FIG. 6). On the diffusion plate 210, picture elements 220 and 222 are alternately disposed along the horizontal direction 240 in an interlaced manner. Therefore, the resolution along the horizontal direction 240 is higher than that of a projector having a single projector device. Further, picture elements 220 and 222 do not overlap each other (at least in the horizontal direction) because of the function of the adjustor in each projector device 204 and 206. As a result, the image quality, which may be otherwise deteriorated by overlapped picture elements along the horizontal direction 510 (FIG. 5) can be avoided. Therefore, a high quality stereo-graphic view is obtainable.

According to the adjusting operation, the size of the whole image formed on the display screen is changed. In such a case, the relation between the picture elements and the lenticular plate may be adjusted by means of adjusting the distance between the display screen and the projection lenses of the first and the second projector devices.

The embodiment described above relates to a stereo-graphic video projector using left eye and right eye information. The present invention is also applicable to a stereo-graphic video projector using first and second left eye information and first and second right eye information, as shown in FIG. 8. Further, the present invention is applicable not only to the stereo-graphic video projector, but also to a non stereo-graphic (flat image) video projector having a plurality of projector devices in which picture elements from the plurality of projector devices are projected alternately on one screen to improve the resolution of a projected image.

What is claimed is:

1. A video projector comprising:

a first projector device having a first light source, a first display panel assembly for receiving light from said first light source and forming a plurality of first image elements, a first projection lens having a first focal point position and disposed at a light emitting side of said first display panel assembly for projecting said plurality of first image elements a predetermined distance, and a first adjusting device for changing a first relative position between said first display panel assembly and said first projection lens to make each of said plurality first image elements have a first size at said predetermined distance, wherein said first display panel assembly includes a first condenser device having a first plurality of condenser lenses disposed at a light incident side of said first display panel assembly, a first black matrix defining therein a first plurality of apertures, each of said apertures being associated with each of said condenser lenses and each of said plurality of first image elements being associated with each of said apertures; and a second projector device having a second light source, a second display panel assembly for receiving light from said second light source and forming a plurality of second image elements, a second projection lens with a second focal point position disposed at a light emitting side of said second display panel assembly for projecting said plurality of second image elements said predetermined distance in a manner such that said plurality of first image elements and said one or more second image elements are disposed adjacent with each other in an interleaved manner, and a second adjusting device for changing a second relative position between said second display panel assembly and said second projection lens to make each of said plurality of second image elements have a second size at said predetermined distance, said second size of each of said plurality of second image elements being substantially equal to said first size of each of said plurality of first image elements, wherein said second display panel assembly includes a second condenser device having a second plurality of condenser lenses disposed at a light incident side of said second display panel assembly, a second black matrix defining therein a second plurality of apertures, each of said apertures being associated with each of said condenser lenses and each of said plurality of second image elements being associated with each of said apertures.

2. A video projector defined in claim 1, wherein each of said first and said second display panels is a liquid crystal display panel.

3. A video projector defined in claim 1, wherein each of said first plurality of condenser lenses and said second plurality of condenser lenses has a micro-lens.

4. A video projector defined in claim 1, wherein said first image corresponds to an image of the left eye and said second image corresponds to an image of the right eye.

5. A video projector defined in claim 1, wherein each of said first display panel assembly and said second panel assembly further comprises a lenticular plate and a light diffusion plate attached to said lenticular plate.

6. A video projector defined in claim 1, wherein said first adjusting device moves said first projection lens along a first optical axis of said first projection lens, and said second adjusting device moves said second projection lens along a second optical axis of said second projection lens.

7. A video projector defined in claim 6, wherein said first display panel assembly contains three display panels which are respectively associated with three primary colors of light, and said second display panel assembly contains three display panels which are respectively associated with three primary colors of light.

8. A video projector defined in claim 1, wherein said first adjusting device moves said first display panel along a first optical axis of said first display panel, and said second adjusting device moves said second display panel along a second optical axis of said second display panel.

9. A video projector defined in claim 1, wherein said first adjusting device is disposed between said first projection lens and said first display panel for changing said first focal point position of said first projection lens, and said second adjusting device is disposed between said second projection lens and said second display panel for changing said second focal point position of said second projection lens.

10. A video projector defined in claim 9, wherein said first adjusting device comprises a glass plate having a thickness varying continuously from thick to thin along a first operational direction which is perpendicular to said first optical axis of said first projection lens, and said second adjusting device comprises a glass plate having a thickness varying continuously from thick to thin along a second operational direction which is perpendicular to said second optical axis of said second projection lens.

11. A video projector comprising:

a first projector device having a first light source, a first display panel assembly for receiving light from said first light source and forming one or more first image elements, a first projection lens having a first focal point position and disposed at a light emitting side of said first display panel assembly for projecting said one or more first image elements a predetermined distance, and a first adjusting device for changing a first relative position between said first display panel assembly and said first projection lens to make each of said one or more first image elements have a first size at said predetermined distance, wherein said first display panel assembly includes a first condenser device having a first plurality of condenser lenses disposed at a light incident side of said first display panel assembly, a first black matrix defining therein a first plurality of apertures, each of said apertures being associated with each of said condenser lenses and each of said one or more first image elements being associated with each of said apertures; and a second projector device having a second light source, a second display panel assembly for receiving light from said second light source and forming one or more second image elements, a second projection lens with a second focal point position disposed at a light emitting side of said second display panel assembly for projecting said one or more second image elements said predetermined distance in a manner such that said one or more first image elements and said one or more second image elements are disposed adjacent with each other in an interleaved manner, and a second adjusting device for changing a second relative position between said second display panel assembly and said second projection lens to make each of said one or more second image elements have a second size at said predetermined distance, said second size of each of said one or more second image elements being substantially equal to said first size of each of said one or more first image elements, wherein said second display panel assembly includes a second condenser device having a second plurality of condenser lenses disposed at a light incident side of said second display panel assembly, a second black matrix defining therein a second plurality of apertures, each of said apertures being associated with each of said condenser lenses and each of said one or more second image elements being associated with each of said apertures.

12. A video projector defined in claim 11, wherein each of said first and said second display panels is a liquid crystal display panel.

13. A video projector defined in claim 11, wherein each of said first plurality of condenser lenses and said second plurality of condenser lenses has a micro-lens.

14. A video projector defined in claim 11, wherein said first image corresponds to an image of the left eye and said second image corresponds to an image of the right eye.

15. A video projector defined in claim 11, wherein each of said first display panel assembly and said second panel assembly further comprises a lenticular plate and a light diffusion plate attached to said lenticular plate.

16. A video projector defined in claim 11, wherein said first adjusting device moves said first projection lens along a first optical axis of said first projection lens, and said second adjusting device moves said second projection lens along a second optical axis of said second projection lens.

17. A video projector defined in claim 16, wherein said first display panel assembly contains three display panels which are respectively associated with three primary colors of light, and said second display panel assembly contains three display panels which are respectively associated with three primary colors of light.

18. A video projector defined in claim 11, wherein said first adjusting device moves said first display panel along a first optical axis of said first display panel, and said second adjusting device moves said second display panel along a second optical axis of said second display panel.

19. A video projector defined in claim 11, wherein said first adjusting device is disposed between said first projection lens and said first display panel for changing said first focal point position of said first projection lens, and said second adjusting device is disposed between said second projection lens and said second display panel for changing said second focal point position of said second projection lens.

20. A video projector defined in claim 19, wherein said first adjusting device comprises a glass plate having a thickness varying continuously from thick to thin along a first operational direction which is perpendicular to said first optical axis of said first projection lens, and said second adjusting device comprises a glass plate having a thickness varying continuously from thick to thin along a second operational direction which is perpendicular to said second optical axis of said second projection lens.

\* \* \* \* \*